No. 678,127. Patented July 9, 1901.
H. D. PERKY.
MACHINE FOR REDUCING FOOD MATERIAL TO FORM AND DISTRIBUTING SAME.
(Application filed Nov. 20, 1900.)
(No Model.) 4 Sheets—Sheet 1.

ATTEST-
Harry L. Ames.
George M. Anderson

INVENTOR-
Henry D. Perky.
By E. W. Anderson.
his Atty.

No. 678,127. Patented July 9, 1901.
H. D. PERKY.
MACHINE FOR REDUCING FOOD MATERIAL TO FORM AND DISTRIBUTING SAME.
(Application filed Nov. 20, 1900.)
(No Model.) 4 Sheets—Sheet 2.

ATTEST-
Harry L. Amer.
George M. Anderson.

INVENTOR-
Henry D. Perky.
By E. W. Anderson.
his Atty.

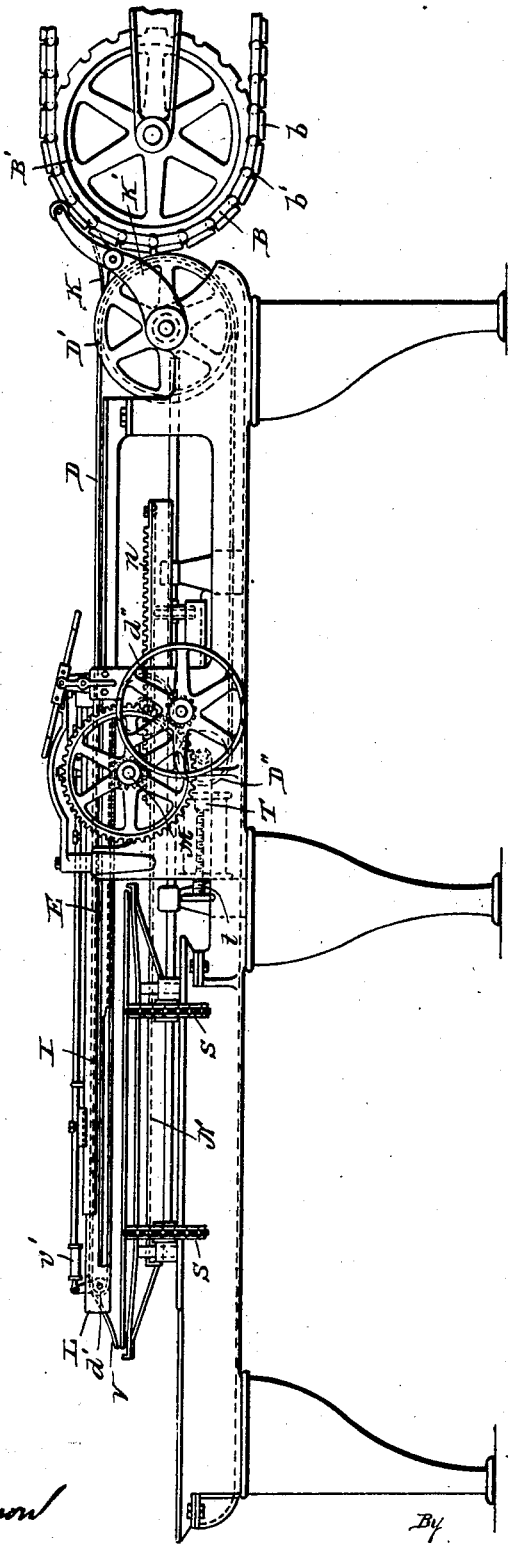

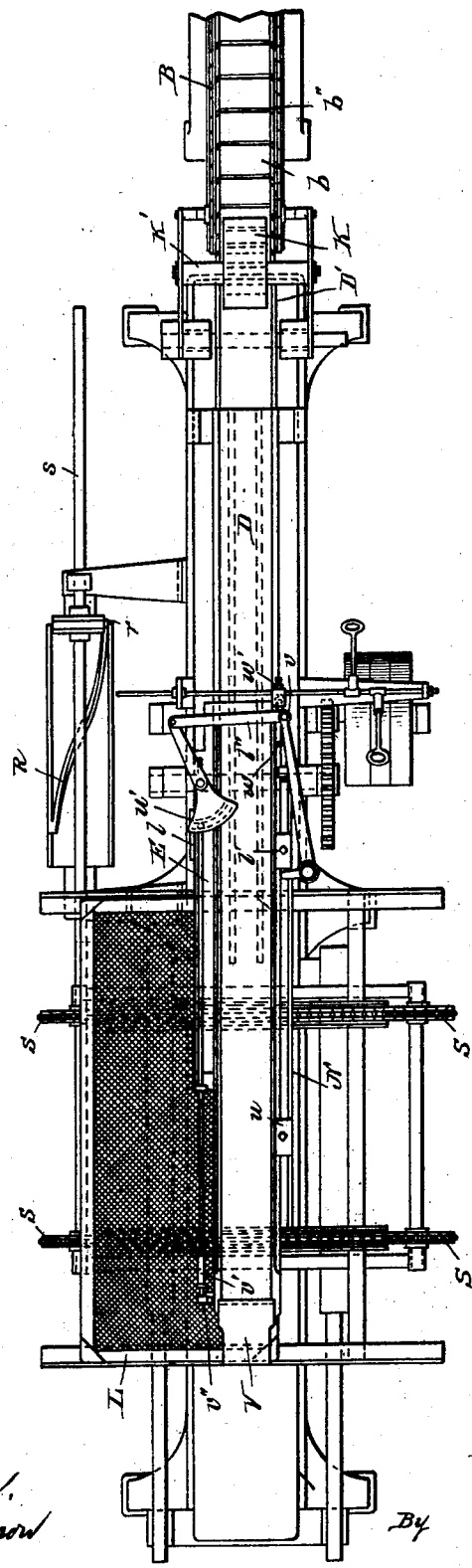

UNITED STATES PATENT OFFICE.

HENRY D. PERKY, OF WORCESTER, MASSACHUSETTS.

MACHINE FOR REDUCING FOOD MATERIAL TO FORM AND DISTRIBUTING SAME.

SPECIFICATION forming part of Letters Patent No. 678,127, dated July 9, 1901.

Application filed November 20, 1900. Serial No. 37,163. (No model.)

*To all whom it may concern:*

Be it known that I, HENRY D. PERKY, a citizen of the United States, residing at Worcester, in the county of Worcester and State of Massachusetts, have invented certain new and useful Improvements in Machines for Reducing Food Material to Form and Distributing the Same; and I do hereby declare the following to be a full, clear, and exact description of the invention, such as will enable others skilled in the art to which it appertains to make and use the same.

Figure 1:
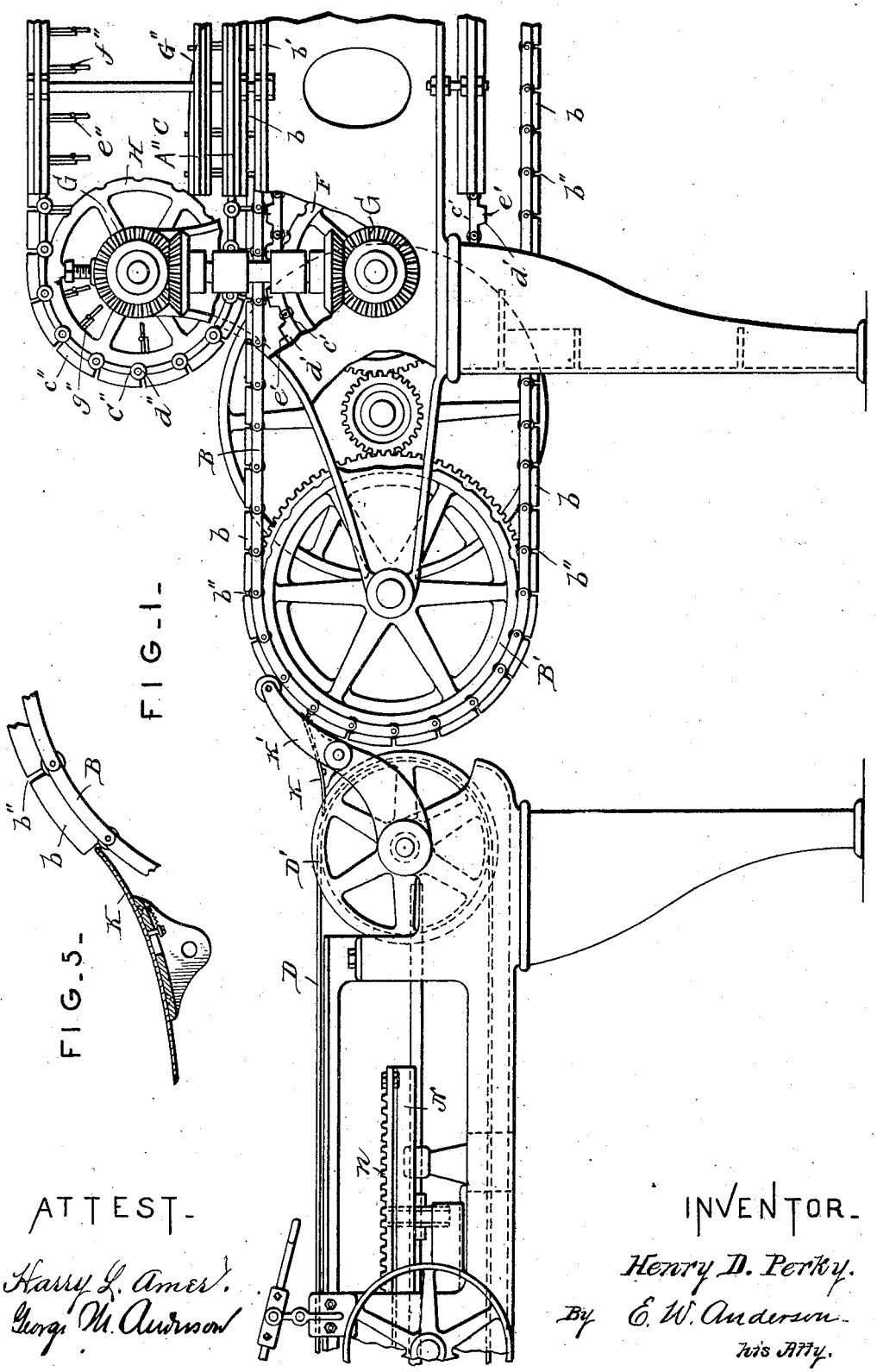
Figure 2:
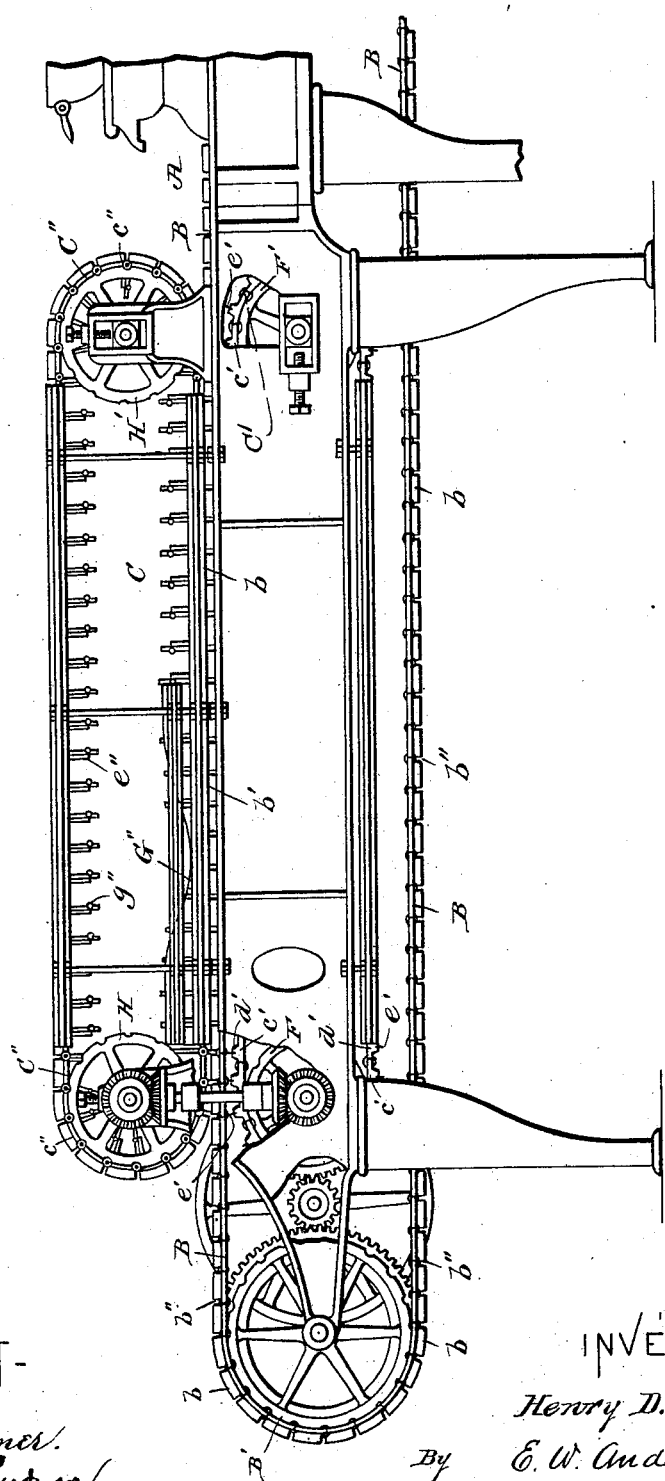

In the accompanying drawings, Figure 1 is a side elevation of the abutting end portions of the cutting and panning mechanisms. Fig. 2 is a side elevation of the cutting mechanism, the reducing mechanism being indicated. Fig. 3 is a side elevation of the panning mechanism in conjunction with the belt-trough B. Fig. 4 is a plan view of the same. Fig. 5 shows the bridge-slide K in section in conjunction with the belt-trough.

This invention has relation to machines for reducing food material in large quantities fed continuously in regularly-subdivided form and placing the same upon receivers for baking or drying or such other subsequent procedure as may be required.

The invention consists, mainly, in means for continuously subdividing and depositing the food material in parallel rows upon receivers.

In the accompanying drawings the letter A designates that portion of a mechanism whereby the material—such, for instance, as wheat—is reduced to shred or thread-like form and deposited upon a sectional traveling trough or receiver continuously and in sufficient quantity for the thickness of the biscuits or subdivisions which are to be formed.

B indicates the sectional belt-trough of this reducing-machine, which passes through and forms a part of the subdividing machinery C, which, being provided with upper and lower traveling knife-belts moving at the same rate of speed as the belt-trough, serves to subdivide the continuously-moving ribbon of material into biscuit-sections. The subdivided material upon the belt-trough, passing beyond the cutting mechanism, is taken from the belt-trough by an inclined bridge-slide, which discharges the biscuit-sections in order upon the depositing-belt D, whereby, in connection with the moving receiving mechanism E, carrying the receivers or pans, the biscuit-sections are placed regularly and in order thereon. I have illustrated in this connection grooved-roll reducing-machines adapted to discharge the wheat or other material in thread-like form, as indicated in Letters Patent No. 533,555, dated February 5, 1895; but it is apparent that other machines adapted to deposit the food material in ribbon form upon the sectional traveling belt-trough B may be employed. This belt-trough consists of sections $b$, each of which is of proper size to hold one biscuit, and these sections form links of the belt, being connected by lateral lugs and pivots in such manner as to leave the interval between the sections clear for the passage of the knives of the cutting mechanism.

B′ indicates one of the end pulleys of the belt-trough, and $b'$ represents the lateral ways of the frame, upon which the lugs of the belt-sections move, these lugs being usually provided with small rollers.

The lower traveling cutter or knife belt C′ consists of sections $c'$, each of which carries a blade $e'$, said sections having each a rise $d'$, adapted to fit a recess $b''$ between belt-sections $b$, as the belts come together in such manner that the blade $e'$ is passed upward through the narrow interval or slot between the trough-sections, the two belts moving along continuously at the same speed. F and F′ indicate the pulleys of this belt. The upper traveling cutter or knife belt C″, also moving at the same speed, consists of sections $c''$, linked together by means of lugs carrying rollers, as at $d''$, and is usually recessed in its lower face or otherwise shaped to give form to the biscuit or to compress the material where the cut is to be made. The blade $e''$ of this section is movable up and down, being carried in a slideway $f'''$ formed upon the back of the section and having a friction-spring, and small lateral rollers $g''$ are provided upon lugs of the blade-frame, adapted to engage a camway G″ of the main frame, which serves to depress the blades of the sections sufficiently to make them coöperate with the blades of the lower knife-belt in cutting the ribbon of material transversely into sections. H and H′ indicate the pulleys of this knife-belt, and G represents gearing whereby the knife-belts are caused to travel at the same rate of speed as the belt-trough. A'' indicates guideways of the rollers $d''$.

Resting upon the belt-trough B at its end where it commences to pass downward around the end pulley B' is a bridge-slide K of about the width of the interval between the side flanges of the trough-section. This bridge-slide is connected to a frame K', which is usually pivoted to the main frame. The bridge-slide is arranged in ways of the frame K', which is provided with a spring designed to hold the slide in projected position, but with a yielding pressure. The face of the bridge-slide is usually formed with a concave curvature longitudinally, and the slide is arranged in a downwardly-inclined position to pass the biscuit-sections to the depositing-belt D, which is arranged at a lower level than that of the belt-trough and is geared to run at the same rate of speed continuously, so that the biscuit-sections are taken from the belt-trough as fast as they are formed and delivered thereby. While the receiving end portion of this belt D moves along continuously and steadily in position with the biscuit-sections, which are received thereon from the bridge-slide, the depositing end portion of the belt shortens and lengthens alternately, by the one movement depositing the biscuit-sections upon the receiver or pan and by the other movement carrying forward the line or feed of biscuit-sections to be deposited in a second row upon the receiver or pan parallel to the first row, the lateral adjustment and longitudinal retraction of the receiver or pan taking place while the depositing-belt is lengthening itself.

The reciprocating receiver frame or carriage N for the pans is geared to move at the same rate of speed as the depositing-belt and the belt-trough.

D' indicates the end pulley of the belt D, which is journaled in fixed bearings of the main frame, which is provided with slideways $l$ for a carriage L, which carries at its delivering end the small end pulley $d'$ of the belt, said belt in its return below passing around a pulley $d''$ in bearings of the carriage L and around another pulley D'', which is seated in bearings of an adjustable holding-piece T, which is connected to the main frame by means of an adjusting-screw $t$. The belt D therefore has an upper end branch upon which biscuit-sections are carried and by which they are deposited and a lower branch which acts as a take-up when the upper branch is shortened as the carriage moves backward.

M indicates a reversing-shaft having rack-and-gear engagement with the slide frames or carriages L and N, whereby said carriages are reciprocated in opposite directions, but at the same rate of speed. The carriage N, having the lower rack $n$, carries the pulleys of the sprocket-chains S, upon which the receivers or pans are placed in position to receive the biscuit-sections from the depositing-belt. These sprocket-chains run transversely and serve to convey the proper intermittent movement to the receivers in the lateral direction, said movement being effected by means of a cam R intermittently engaging the pawls $r$ of the shaft $s$.

At the end of the carriage L is pivoted a depositing lip or slide V, which takes the biscuit-sections from the end of the depositing-belt D and passes them down its incline to the receiver or pan. By means of reversing-gear (indicated at $v$) this depositing-lip is raised at the end of the movement of discharge and held in the raised position until the extended belt D is in position to place another row of biscuit-sections on the pan, when said lip is lowered promptly to inclined position. The degree of inclination is readily adjustable while the machine is in motion by means of the sleeve-screw $v'$, the operation of which changes the position of the worm $v''$.

The reversing devices are operated automatically by the carriage L through its cam-lugs $l$ and $l'$, which alternately engage the switch-lever $l''$. By means of the slides $u$ and $u'$, which carry said cam-lugs, and the adjusting-screw mechanism (indicated at $w$ and at $w'$) the position of either or both of the cam-lugs can be changed. In this manner means are provided for lengthening or shortening the stroke of the carriages L and N at either or both ends of the movement.

The material carried by the belt-trough between the knife-belts is subdivided thereby, the blades of the lower knife-belt passing upward through the intervals between the trough-sections, which are held in position by their guideways, and the blades of the upper knife-belt being depressed by means of the camways, which engage the rollers of the blade-frames. The upward push of the lower blade and the downward action of the compressing edge of the upper knife-section render the action of the upper knife clean and effectual and at the same time obviate any tendency of the material to adhere in the slot between the trough-sections. The biscuit-sections thus formed are taken from the belt-trough by the bridge-slide, which may have a short reciprocating motion, and passed to the depositing-belt, which, with the aid of its depositing-lip, places them upon the receiver or pan, which by an intermittent lateral movement effects an arrangement of the biscuit-sections in parallel rows. As one receiver or pan is filled another is placed upon the carriage to be filled in turn. Usually the carriage N is made wide enough to hold two or more pans side by side in order to give the attendant sufficient time to remove a filled pan and place an empty one upon the sprocket-belts while an intermediate pan is being filled.

Having described this invention, what I claim, and desire to secure by Letters Patent, is—

1. The combination with reducing mechanism, and panning mechanism, of upper and lower traveling knife-belts, a belt-trough shaping the material from the reducing mechanism in elongated or ribbon form, and carrying the same between the knife-belts whereby it is subdivided, and a bridge-slide or transfer device whereby the subdivisions or sections of the material are taken from the trough-belt, and placed upon the belt of the panning mechanism, substantially as specified.

2. The combination with upper and lower traveling knife-belts, and with panning mechanism running at the same rate of speed as said knife-belts, of a sectional belt-trough, adapted to carry the material deposited thereon in elongated or ribbon-like form, and passing between the knife-belts at the same rate of speed, and a bridge-slide or transfer device whereby the subdivisions or sections of the material are taken from the trough-belt and placed upon the belt of the panning mechanism, substantially as specified.

In testimony whereof I affix my signature in presence of two witnesses.

HENRY D. PERKY.

Witnesses:
J. R. GILKESON,
ALBERT H. CHAFFEE.